Jan. 13, 1959 F. A. LAMBACH 2,867,936
PUSH-BUTTON FISHING BOBBER
Filed Nov. 16, 1955 2 Sheets-Sheet 1
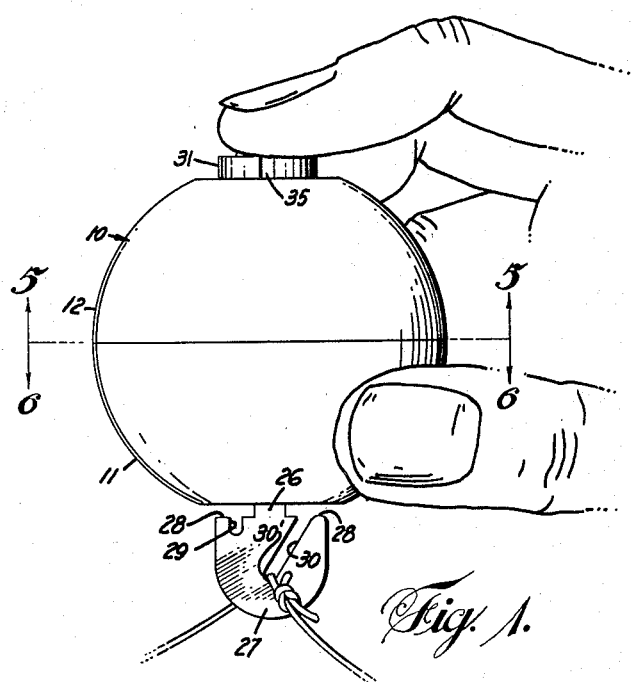
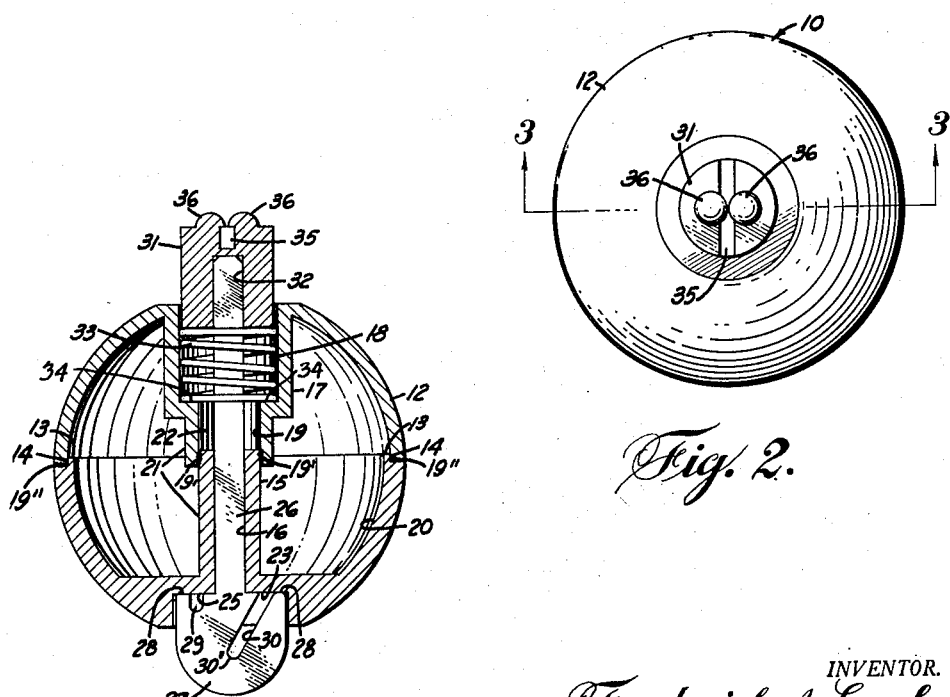
INVENTOR.
Frederick A. Lambach Jan. 13, 1959     F. A. LAMBACH     2,867,936
PUSH-BUTTON FISHING BOBBER Filed Nov. 16, 1955     2 Sheets-Sheet 2

INVENTOR.
Frederick A. Lambach
BY

United States Patent Office 2,867,936
Patented Jan. 13, 1959

2,867,936

PUSH-BUTTON FISHING BOBBER

Frederick A. Lambach, Omaha, Nebr.

Application November 16, 1955, Serial No. 547,103

11 Claims. (Cl. 43—44.95)

This invention relates to fishing bobbers and more particularly to a push-button type fishing bobber.

In the past, certain of the push-button type bobbers have used a wire hook whereby a fishing line was attached to the bobber by pressing the line between the hook and the outer surface of the bobber, the tip of the hook being received in an opening in the bobber casing.

However, bobbers of the wire-hook type do not provide a sufficiently secure grip on the fishing line because the underside of the wire hook is necessarily curved more sharply and about a shorter radius than the radius of curvature of the outer side of the normally round bobber.

This difference in curvature leaves a small space between the underside of the hook and the adjacent surface of the bobber, whereby the fishing line is not as securely held under the hook as would be the case if the under surface of the hook would fit tightly against the upper side of the bobber.

Because the wire-hook bobbers slide when they are intended to grip securely they have been used improperly by fishermen who slide them along the line without operating the push-button for release of the wire-hook. This causes the plastic casing of the bobber to be worn away to a point that the bobber will no longer grip securely on the line and the bobber becomes inoperable as a bobber for still fishing.

A further disadvantage of the wire-hook type of push-button bobber lies in the difficulty of adjusting the wire-hook by rotating it from a position for holding the line more firmly to an alternate position for holding the underside of the hook in a position spaced from the bobber for permitting the line to run freely therethrough for use during casting, as above described. This rotation of the wire-hook requires two hands and it is therefore an object of my invention to provide a bobber shiftable from casting to still fishing positions by the use of only one hand.

In addition, no means were provided for preventing the wire-hook from rotating with respect to the bobber casing when the push button was operated and the fisherman had to hold the bobber in two hands when attaching it to a fishing line.

An object of the present invention is to provide a new and improved push-button type fishing bobber which overcomes the above noted deficiencies.

Another object of the present invention is to provide a bobber of the type described above including a new and improved means for attaching the bobber to a fishing line whereby the bobber may be attached in a substantially fixed position on the line for use in still fishing or whereby the bobber may be slidably attached to the line for use as a casting bobber, to permit that part of the line which is disposed between the sinker and the knot in the line to slide freely through the slot.

Still another object of the present invention is to provide a bobber which may be securely attached to or detached from a fishing line in a more convenient manner than heretofore known.

In one embodiment, the bobber of the present invention includes a push-button operated fishing line attachment head which will not rotate with respect to the bobber casing, and which may be attached to a fishing line by a simple one-handed operation. The head is provided with a still fishing slot and a casting slot, and need not be rotated at all. Moreover the head may be attached to the fishing line by a jam fit which is suitably tight so as to securely hold the line and prevent all sliding movement of the line through the head and thereby also to induce the fisherman to operate the push-button for adjusting the position of the bobber with respect to the line rather than sliding the bobber wearingly on the line without operating the push-button. Also, the push-button is provided with a constricted slot whereby a fishing line may be snapped into or out of the slot when the bobber is attached to the line for use as a still fishing signalling type bobber.

Yet another object of the present invention is to provide a bobber as described above including new and improved means for securing one end of the bobber to a fishing line in a substantially fixed position, and for releasably attaching another end of the bobber to the line whereby the bobber is normally arranged to float on its side, the construction and arrangement being such that the line is snapped free from said other end of the bobber when the hook end of the line is tensioned by a strike or by a snag to permit the line to straighten out to avoid breakage of the line as I have found that breakage occurs more easily when the line is bent.

All of the above disadvantages of wire-hook push-button bobbers are further accentuated by the incoming popularity of the mono-filament type of fishing line, which is of a smaller diameter and a smoother surface than silk lines, whereby it slips by more freely under the hook. Still further, mono-filament line is formed of nylon, and as nylon is a hard substance as compared to the plastic of the bobber, the nylon line tends to wear away the plastic under the hook as the fisherman slides the bobber up and down the line to adjust the position of the bobber.

While only a short time is needed to adjust a wire hook into a new position, still this is a two-handed manipulation, as one hand must be used for holding the bobber while the other hand is used to push and twist the push-button, whereas one hand is sufficient for both holding the bobber and pushing the push-button when twisting of the push-button is unnecessary.

Therefore, a further object is to provide a bobber so constructed that rotation of the push-button is unnecessary and the fisherman needs to use only one hand to manipulate the bobber in applying it to a line for simple, one-handed operation.

A particular object is to provide a push-button bobber which eliminates these various disadvantages of the prior art.

A further disadvantage of the wire-hook type of bobber has been that the end of the wire has sharp edges which can cut the fingers and can also cut the line at times when the line accidentally is misplaced to a position disposed under the sharp edges of the terminal end of the hook.

Heretofore, the fishing line has been attached at times not only to the hook end of the bobber but also has been connected to the push-button side of the bobber.

It is an object of this invention to provide a bobber construction whereby the line can be connected to the push-button in addition to the hook or head in a manner whereby it becomes quickly snapped free when a tension is placed on the line whereby thereafter the tension is all taken by the line itself, whereby damage to the hook or head portion of the bobber is avoided as heretofore this has been common in wire-hook bobbers. Still more important, it is the object of this construction to permit the line to snap free of the hook and to straighten out to avoid line breakage and sometimes loss of a large fish, because when the line is tensioned to a point of danger of breakage of the line, the line snaps free whereby there are no bends in the line, as I have found that breakage occurs more easily at a bend in the line, and thus line breakage is avoided.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

A particular objective is to provide a push-button bobber having a head portion adapted to prevent the bobber from turning as has heretofore caused a twisting of the line, to permit that part of the line which is disposed between the sinker and the knot in the line to slide freely through the slot.

Fig. 1 is a view in side elevation of the bobber of the present invention and illustrating the bobber being attached to a finishing line.

Fig. 2 is a top plan view of the fishing bobber of the present invention;

Fig. 3 is a view taken along the line 3—3 of Fig. 2;

Figure 4:
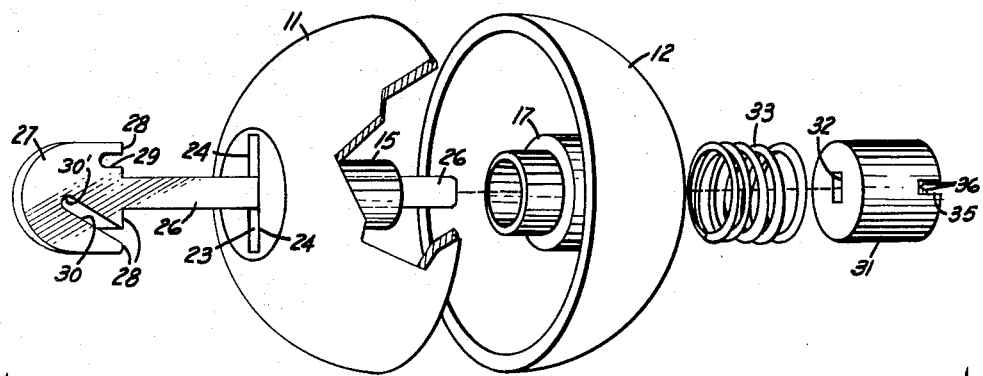
Fig. 4 is an exploded perspective view of the fishing bobber of the present invention having a portion broken away for illustrative purposes.
Figure 5:
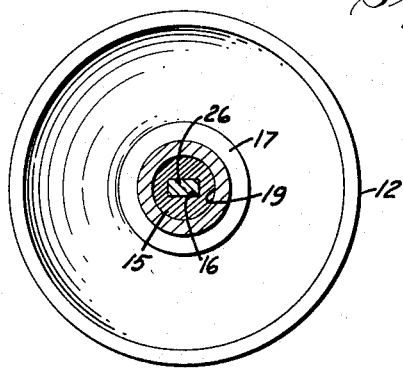
Fig. 5 is a view taken along the line 5—5 of Fig. 1.
Figure 6:
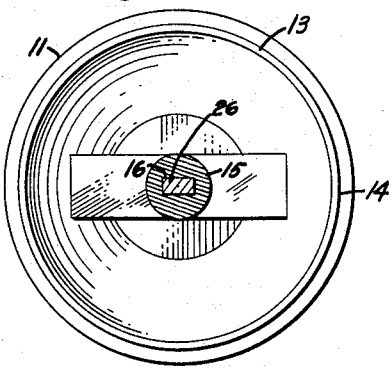
Fig. 6 is a view taken along the line 6—6 of Fig. 1.

Referring now to the drawings, the embodiment of the present invention, there illustrated, includes a substantially spherical hollow casing 10 which is formed of two half spherical segments 11 and 12. As best shown in Figs. 3 and 4, the segment 11 is provided with an annular lip 13 which provides a peripheral shoulder 14 extending the circumference of the open end of the segment. Also, the segment 11 is provided with an inwardly extending integrally formed cylindrical tube 15 which has a passage 16 extending therethrough.

As best shown in Fig. 3, the segment 12 is also provided with an inwardly extending integrally formed cylindrical tube 17. This tube includes an enlarged cylindrical portion having a passage 18 extending therethrough, and a reduced cylindrical portion having a passage 19 extending therethrough which communicates at one end with the passage 18 and is adapted at the other end to receive the outer end of the tube 15, to which it is suitably secured in a water tight manner such as by a suitable cement best seen at 19' in Fig. 3.

The construction of the casing 10 is such that the two segments 11 and 12 may be easily assembled. The open end of the segment 12 overlaps the annular lip 13 and the segments 11 and 12 are there secured together in any suitable manner such as by suitable cement seen at 19" in Fig. 3, for providing a water tight fit.

As thus described, the two segments are, for all practical purposes, joined together to form a unitary spherical casing having an internal buoyant fluid tight chamber 20 which is traversed by a tube 21 which provides a passage 22 extending diametrically through the casing.

One end of the passage 22 communicates with a recess 23 which faces outwardly and extends through the outer surface of the casing 10 at one end thereof. The recess 23 is substantially rectangular in cross section and is defined by a pair of substantially parallel shoulders 24. The area of the casing around the recess 23 is substantially planar so that the outer edges of the shoulders 24 are substantially straight. Also, as best shown in Fig. 3, the recess has a substantially planar base surface 25 which is interrupted at its mid-point by the passage 16.

Slidably arranged in the passage 16 is a substantially rectangular stem 26 which is provided with a length such that when a first end of the stem is flush with the base surface 25 of the recess 23, the second end of the stem extends through the passage 19 and is disposed outwardly of the casing 10. The stem has a substantially rectangular cross section and the passage 16 is also provided with a substantially rectangular cross section whereby the stem 26 and passage 16 function as a key and keyway whereby the stem is prevented from rotating in the passage 16.

The first end of the stem carries a fishing line attachment head 27 which may be formed of a one piece construction with the stem 26. More particularly, the head 27 is provided with a base portion having a substantially planar under surface 28 which is arranged to seat in a face to face relationship on the base surface 25 of the recess 23. Also, the head is provided with a first fishing line receiving slot 29 which is disposed substantially parallel to the stem 26 and which opens through the under surface 28 of the head. The long dimension of this slot is substantially less than the depth of the rectangular recess 23 whereby the slot 29 is disposed entirely within the recess and between the shoulders 24 when the head is seated in the recess as shown in Fig. 3. The head is provided with another fishing line receiving slot 30 which also opens through the under surface 28 of the head and is provided with a long dimension whereby a substantial outer portion of the slot 30 extends beyond the outer wall surface of the casing 10 when the head is seated as shown in Fig. 3.

Finally, the head 27 is provided with a thickness which is slightly less than the spaced apart distance between the oppositely facing shoulders 24 whereby the opposite side surfaces of the head are in a closely spaced apart face to face relation with the respective adjacent shoulders 24 when the head is seated in the recess.

The second end of the stem carries a substantially cylindrical push-button 31. The push-button is provided with a substantially rectangular cavity 32 of slightly smaller cross section than that of the stem 26, whereby the push-button may be heated and expanded and thereafter slipped onto the second end of the stem to form a substantially permanent part therewith when the button has cooled and contracted into a tight fit around the stem.

The push-button is arranged to be slidably received in the passage 18 and is spring biased into the retracted position, as shown in Fig. 3, by a spring 33 arranged in the passage 18, and which bears at one end on an annular shoulder 34 and which bears at its other end on the under surface of the push-button 31.

Thus, it may be seen that the push-button 31 is shiftable between a normally retracted position wherein the head 27 is seated in the recess 23, and an operated depressed position, as shown in Fig. 1, wherein the head is unseated and shifted outwardly with respect to the recess 23 so that the under surface 28 of the head is disposed outwardly of the casing 10.

The outer end of the push-button 31 is provided with a slot 35 which has a lower portion which is adapted slidably to receive a fishing line, and a constricted upper portion. The side walls of the slot 35 are disposed substantially parallel to the side walls of the slot 29 and the constriction is provided by a pair of bead like nibs 36 which extend toward each other from the opposite sides of the slot 35. The nibs are disposed in a closely spaced apart relation which is substantially less than the normal diameter of a fishing line whereby a line may be snapped through the nibs and into or out of the slot 35.

As best seen in Fig. 3, the casting slot 30 has side walls which are preferably straight and in parallelism with each other. The wall 30' of the outer end of the casting slot 30 is curved as the head 27 is seen in from the side as in Fig. 3.

It is preferred that the curved end wall 30' of the outer end of the casting slot 30 be of a semi-cylindrical shape about an axis disposed at a right angle to the flat parallel side surfaces of the head 27 and for that reason disposed also at a right angle to the length of the stem 26, when a cast is being made and the line is disposed through the slot 30 as seen in Fig. 1.

This is true because the endmost portion of the wall of the slot 30 lies along substantially a straight line whereby the fishing line does not tend to turn, as it does under a round wire hook. The avoiding of twisting is important as it will permit that part of the line which is disposed between the sinker and the knot in the line to slide freely through the slot 30.

The head 27 also has a substantial width and this causes the side edges of the head 27 to bump a fishline extending through the slot 30 when the bobber attempts to turn, thus preventing rotation of the bobber and twisting of the fishline in a way a thin wire hook could not do.

Figure 7:
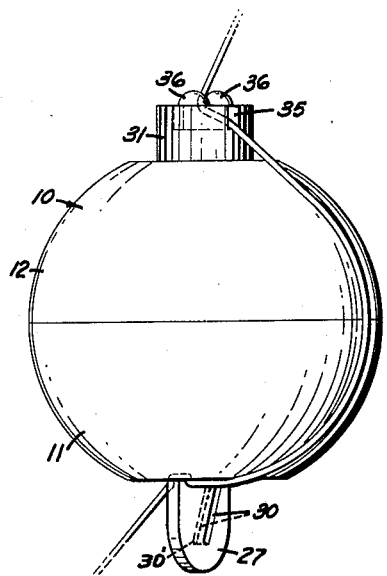
Fig. 7 is a view in side elevation of the bobber of the present invention and illustrating the bobber when attached to a fishing line in such a manner that the arrangement is suitable for still fishing whereby the bobber is operative as a signalling type bobber.

In operation of the bobber, while still fishing, the push button 31 is depressed to unseat the head 27 and the line is passed through the slot 29 at the desired depth setting above the hook, as shown in Fig. 7. The push button is then released to seat the head in the recess 23 and to lock the bobber into a substantially fixed position on the line by wedging the line into a jam fit between the head 27 and the shoulders 24 of the recess 23, as best shown in Fig. 7. The bobber then floats in a substantially upstanding position (Fig. 1) on the surface of the water and suspends the hook and sinker end of the line at any pre-set depth below the surface of the water.

In addition, the bobber may be used as a signalling type bobber. In this arrangement, the head end of the bobber is locked into a substantially fixed position on the line by passing the fishing line through the slot 29, as previously noted. The line is then run around the rounded outer wall surface of the casing 10 and is snapped through the nibs 36 into the slot 35. The bobber then floats in a normal position upright (Fig. 7) and suspends the hook and sinker end of the line at any pre-set depth below the surface of the water. When a fish strikes the hook and tensions the hook end of the line, or when the line is tensioned by a snag, the line is snapped through the nibs 36 and free of the slot 35 whereby the bobber swings into a substantially upstanding position, signalling the strike to the fisherman as an incidental effect. The primary effect of the action in which the line snaps free of the nibs 36 and slot 35 is that thereafter the line is free to extend in a straight line from the pole to the fish or to the snag, thus eliminating any bends in the line.

I have found that bends in the line cause it to break more easily and at the bend whereby letting the line straighten out causes the line to be able to take much more tension without breaking at such a time the tension causes the head portion 27 to pull out of the recess 23 permitting that respective portion of the line to straighten also.

In operation of the fishing bobber with a casting rod, the push-button 31 is depressed to unseat the head and the fishing line is inserted through the open base end of the slot 30 and into the slot as shown in Fig. 1. Also, the fishing line is knotted between the fishing rod and the bobber as also illustrated in Fig. 1. When the pushbutton is released, the head seats, as illustrated in Fig. 3, whereby the line may be pulled freely back and forth through the slot 30 in the head between the knot in the line and the hook or sinker end of the line.

The fisherman reels in the line until the bobber has slid on the line into a position adjacent to the hook or sinker. As the cast is made, the bobber rides out with the hook until the hook hits the water, whereafter the bobber tends to seek a floating position on the surface of the water while the hook and sinker drop to a depth determined by engagement of the knotted fishing line with the sides of the slot 30. When the knot has engaged the sides of the slot 30, the bobber suspends the hook and sinker at the pre-set depth below the surface of the water.

While there has been described an embodiment of the invention, it will be understood that various modifications may be made therein, and it is intended to cover in the appended claims all such modifications as fall within the true spirit and scope of the invention.

What is claimed is:

1. A fishing bobber comprising; a buoyant body portion including a casing, the outer surface of said casing having a pair of spaced apart outwardly facing shoulders defining an outwardly facing groove, a head carried by said casing and arranged to seat in said groove between said shoulder for locking the bobber to a fishing line by wedging the line between said shoulders and said head, and said head having a slot disposed outwardly of said shoulders when the head is seated, said slot being adapted slidably to receive a fishing line whereby the bobber is arranged to slide on the line.

2. A fishing bobber comprising; a buoyant body portion including a casing, said casing having an outwardly facing recess defined by a pair of spaced apart shoulders, a head carried by said casing and arranged to shift between a first position wherein a base portion of the head is seated in said recess between said shoulder and a second position wherein said base portion is unseated and is disposed outwardly with respect to said recess, said head having a first slot disposed entirely within said recess when said head is in said first position, said first slot being adapted to receive a fishing line for locking the casing to the line by wedging the line between said shoulders and said head when the head is in said first position, and said head having a second slot disposed outwardly of said casing and said recess and being adapted slidably to receive a fishing line when said head is in said first position.

3. The construction as set forth in claim 2 wherein each of said slots has an open end extending through the base portion of said head, and wherein said recess has a bottom surface engageable with said base portion for closing said slots when the head is in said first position.

4. A fishing bobber comprising; a buoyant body portion including a casing, said casing having an outwardly facing recess defined by a pair of spaced apart shoulders, a head carried by said casing and arranged to shift between a first position wherein a base portion of the head is seated in said recess between said shoulders and a second position wherein said base portion is unseated and is disposed outwardly with respect to said recess, said head having a first slot disposed entirely within said recess when said head is in said first position, said first slot being adapted to receive a fishing line for locking the casing to the line by wedging the line between said shoulders and said head when the head is in said first position, said casing having an outwardly extending button provided with a further and open-ended slot having an open inner end portion adapted slidably to receive a fishing line and a constricted outer end portion having a width less than the diameter of the fishing line whereby the line may be snapped through said constricted outer end portion, and means including said button for shifting the head between said first and second positions.

5. The construction as set forth in claim 4 wherein said outer end portion is constricted by a pair of closely spaced apart bead-like protrusions.

6. The construction as set forth in claim 4 wherein said casing is substantially spherical in form and said head and said button extend outwardly from diametrically opposite positions with respect to said casing.

7. The construction as set forth in claim 4 wherein said head is provided with a second slot disposed extending outwardly of said casing and said recess, said slot being adapted slidably to receive a fishing line when said head is in said first position.

8. A fishing bobber comprising; a substantially spherical fluid tight casing, said casing having an outwardly facing recess defined by a pair of spaced apart shoulders, a tube having a passage communicating at one end with said recess and extending diametrically through said casing, a stem slidably arranged in said passage, said stem and said passage having a pair of complementary surfaces such that said stem and said passage function as a key and key-way for preventing the stem from rotating in said tube, a head carried by one end of said stem and arranged to shift with said stem between a first position wherein a base portion of the head is seated in said recess between said shoulders and a second position wherein said base portion is unseated and is disposed outwardly with respect to said recess, said head having a first slot disposed entirely within said recess when said head is in said first position, said first slot being adapted to receive a fishing line for locking the casing to the line by wedging the line between said shoulders and said head when the head is in said first position, said head having a second slot disposed extending outwardly of said casing and said recess and being adapted slidably to receive a fishing line when said head is in said first position, a button carried by the other end of said stem and arranged to shift between a retracted position for shifting said head into said first position and a depressed position for shifting said head into said second position, said button having an end portion extending outwardly with respect to said casing and having an open ended slot extending therethrough, said slot having an inner end portion adapted slidably to receive a fishing line and a constricted outer end portion having a width less than the diameter of the fishing line whereby the line may be snapped through said constricted outer end portion, and a spring for urging said push-button into said retracted position.

9. The construction as set forth in claim 8 wherein each of said slots has an open end extending through the base portion of said head, and wherein said recess has a bottom surface engageable with said base portion for closing said slots when the head is in said first position.

10. The bobber of claim 1 which further comprises the following features: said head being of a substantial thickness and the endmost portion of the wall of said slot lying along substantially a straight line whereby said bobber does not tend to turn on a fishline extending through said slot for avoiding twisting of the line.

11. The bobber of claim 1 which further comprises the following features: said head being of a substantial thickness and the endmost portion of the wall of said slot lying along substantially a straight line whereby said bobber does not tend to turn on a fishline extending through said slot for avoiding twisting of the line, said head also being of a substantial width whereby its side edges bump a fishline extending through said slot when the bobber attempts to turn, thus preventing rotation and twisting of the fishline.

References Cited in the file of this patent

UNITED STATES PATENTS

| | | |
|---|---|---|
| 2,415,692 | Huston | Feb. 11, 1947 |
| 2,481,346 | Rigby | Sept. 6, 1949 |
| 2,719,381 | Matras | Oct. 4, 1955 |
| 2,726,476 | Coughlin | Dec. 13, 1955 |

FOREIGN PATENTS

| | | |
|---|---|---|
| 527,405 | Canada | July 10, 1956 |